(12) United States Patent
Doric

(10) Patent No.: US 9,207,405 B2
(45) Date of Patent: Dec. 8, 2015

(54) HYBRID FIBER-OPTIC AND FLUID ROTARY JOINT

(71) Applicant: Optomak, Inc., Quebec (CA)

(72) Inventor: Sead Doric, L'Ancienne-Lorette (CA)

(73) Assignee: OPTOMAK, INC. (CA)

( * ) Notice: Subject to any disclaimer, the term of this patent is extended or adjusted under 35 U.S.C. 154(b) by 131 days.

(21) Appl. No.: 14/088,924

(22) Filed: Nov. 25, 2013

(65) Prior Publication Data

US 2014/0147077 A1    May 29, 2014

Related U.S. Application Data

(60) Provisional application No. 61/730,270, filed on Nov. 27, 2012.

(51) Int. Cl.

| | | |
|---|---|---|
| *G02B 6/26* | (2006.01) | |
| *G02B 6/42* | (2006.01) | |
| *G02B 6/36* | (2006.01) | |
| *G02B 6/35* | (2006.01) | |
| *G02B 6/32* | (2006.01) | |

(52) U.S. Cl.
CPC ............ *G02B 6/3604* (2013.01); *G02B 6/3628* (2013.01); *G02B 6/32* (2013.01); *G02B 6/3504* (2013.01)

(58) Field of Classification Search
CPC ...... G02B 6/32; G02B 6/3604; G02B 6/3825; G02B 6/3628; G02B 6/3504; G02B 27/642
USPC ........... 385/25, 26, 31, 33, 53, 56, 57, 74, 88, 385/93, 139
See application file for complete search history.

(56) References Cited

U.S. PATENT DOCUMENTS

| | | | |
|---|---|---|---|
| 4,643,521 A * | 2/1987 | Harstead et al. ................ 385/26 |
| 4,725,116 A | 2/1988 | Spencer et al. | |
| 2007/0217736 A1 | 9/2007 | Zhang et al. | |
| 2010/0044103 A1* | 2/2010 | Moxley et al. ................... 175/16 |
| 2013/0044976 A1* | 2/2013 | Zhang et al. ..................... 385/26 |
| 2014/0323877 A1* | 10/2014 | Courtney et al. ............. 600/478 |

* cited by examiner

*Primary Examiner* — Kaveh C Kianni
*Assistant Examiner* — Hung Lam
(74) *Attorney, Agent, or Firm* — Mitch Harris, Atty at Law, LLC; Andrew M. Harris

(57) ABSTRACT

A hybrid rotary joint provides both optical and fluid channels for applications such as optogenetic research. The rotary joint has a stationary component and a rotating component. The optical channel and fluid channel permit simultaneous and rotation-insensitive passage of light and fluid from the stationary to the rotating side of the hybrid rotary joint. The input to the optical channel is provided via an input optical fiber and the input to the fluid channel is fluid from a fluid source. The outputs are an optical fiber output and a fluid channel output. As light passes from the stationary side to the rotating side of the hybrid rotary joint, it is deflected off a beam deflector having an angular orientation that is passively aligned and made independent of the angular orientation of the rotating component via the interaction between magnets attached to each of the beam deflector and the stationary component.

24 Claims, 15 Drawing Sheets

_US 9,207,405 B2_

HYBRID FIBER-OPTIC AND FLUID ROTARY JOINT

This U.S. Patent Application claims priority under 35 U.S.C. 119(e) to U.S. Provisional Patent Application Ser. No. 61/730,270, filed on Nov. 27, 2012.

BACKGROUND OF THE INVENTION

The present invention relates to the field of optical devices, and more particularly concerns a hybrid fiber-optic and fluid rotary joint for optogenetic applications and the like.

Field of the Invention

Optogenetics is a technological field where genetic and optical methods and devices are combined to monitor and control targeted biological functions and events in specific cells (e.g. neurons, heart muscles cells) of living tissue. Optogenetics is particularly well adapted for in vivo studies of biological functions in mammals and other animals. Early optogenetic applications typically involved sending light from a laser or a light-emitting diode (LED) source along an optical fiber toward the brain of a laboratory animal, typically a mouse or a rat. In recent years, however, these simple optical links have evolved into more complex systems, which now include fiber-coupled light sources and their drivers, light shutters or modulators, rotary joints for in vivo experiments, beam splitters, fiber-optic patch cords, various fiber-optic cannulas with implantable fibers, and the like.

Background of the Invention

Among optogenetic components, fiber-optic rotary joints (FORJs) provide simple and inexpensive passive tools for connecting light sources to freely moving laboratory animals via optical fibers. Indeed, FORJs enable uninterrupted transmission of an optical signal across a rotating interface created between two optical fibers as one is rotating about its axis. FORJs facilitate optogenetic experiments involving a freely moving animal by allowing the unimpaired movement of the animal, while maintaining satisfactory transfer of optical power between the two fibers and reducing the chances of damaging the fiber due to excessive torque. Various types of FORJs exist including single channel and multichannel (e.g. dual channel) FORJs. Single channel FORJs have a single input and a single output port, while multichannel FORJs can have multiple input and/or output channels, and may for example involve intensity and wavelength division of light.

Currently developed optogenetic systems not only use optical signals but have become hybrid networks that can combine, for example, optical and fluidic functionalities for monitoring interactions of biological functions and systems with light and fluids. For example, such hybrid rotary joints could be used to directly observe the influence of various drug solutions on cell processes and enable in vivo monitoring of these interactions. In this context, a need has arisen for hybrid FORJs that include fluidic channels in addition to optical channels.

There therefore exists a need in the art for a cost-effective and compact hybrid fiber-optic and fluid rotary joint capable of reliably delivering light signal and administering fluid to freely moving animals in optogenetic applications.

SUMMARY OF THE INVENTION

According to an aspect of the invention, there is provided a hybrid fiber-optic and fluid rotary joint.

The hybrid rotary joint generally includes a stationary component and a rotating component which are rotatable relative to each other about a rotation axis and which define respective stationary and rotating sides of the hybrid rotary joint. The hybrid rotary joint also includes an optical channel and a fluid channel, which respectively allow for the simultaneous and rotation-insensitive passage of light and fluid from the stationary to the rotating side of the hybrid rotary joint.

The hybrid rotary joint is configured to receive light from an input optical fiber component and fluid from a fluid source, to transmit the light and fluid along the optical and fluid channels, and to output the light and fluid into an output optical fiber component and a fluid receiver connected to the rotating side of the hybrid rotary joint. In particular, as light passes from the stationary side to the rotating side of the hybrid rotary joint, it is deflected off a beam deflector whose angular orientation is passively aligned and made independent of the angular orientation of the rotating component via the interaction between magnets attached to each of the beam deflector and the stationary component.

In some embodiments of the invention, the hybrid rotary joint includes mechanisms aimed at reducing loss on the optical transmission of the light through the optical channel, which may arise when a rotating fluid conduit of the fluid channel momentarily passes between the beam deflector and the light incident thereonto.

In some of these embodiments, the optical channel preferably includes therealong a beam expander disposed upstream of the beam deflector and configured for increasing the width of the light beam from the input optical fiber component, such that a smaller proportion of the optical power carried by the light beam is blocked by the rotating fluid conduit.

In some embodiments, the hybrid rotary joint may include one or more angularly spaced obstacles that rotate along the rotating component and are parallel to the rotating fluid conduit. The one or snore spaced obstacles may constitute additional fluid conduits parallel to each other, preferably with the same radial distance from the center of rotation and at such azimuthal distance that at any given time or angular position of the rotating component only one fluid conduit may partially eclipse the light beam. The presence of additional rotating obstacles mimics the blocking effect of the rotating fluid conduit and improves the uniformity of transmitted optical power level as a function of the angular position of the rotating component with respect to the stationary component. Also, in this way the hybrid rotary joint provides the possibility to be used with multichannel fluid swivels or allows for fluid conduit cleaning only after all of them have been used.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATED EMBODIMENT

Figure 1:
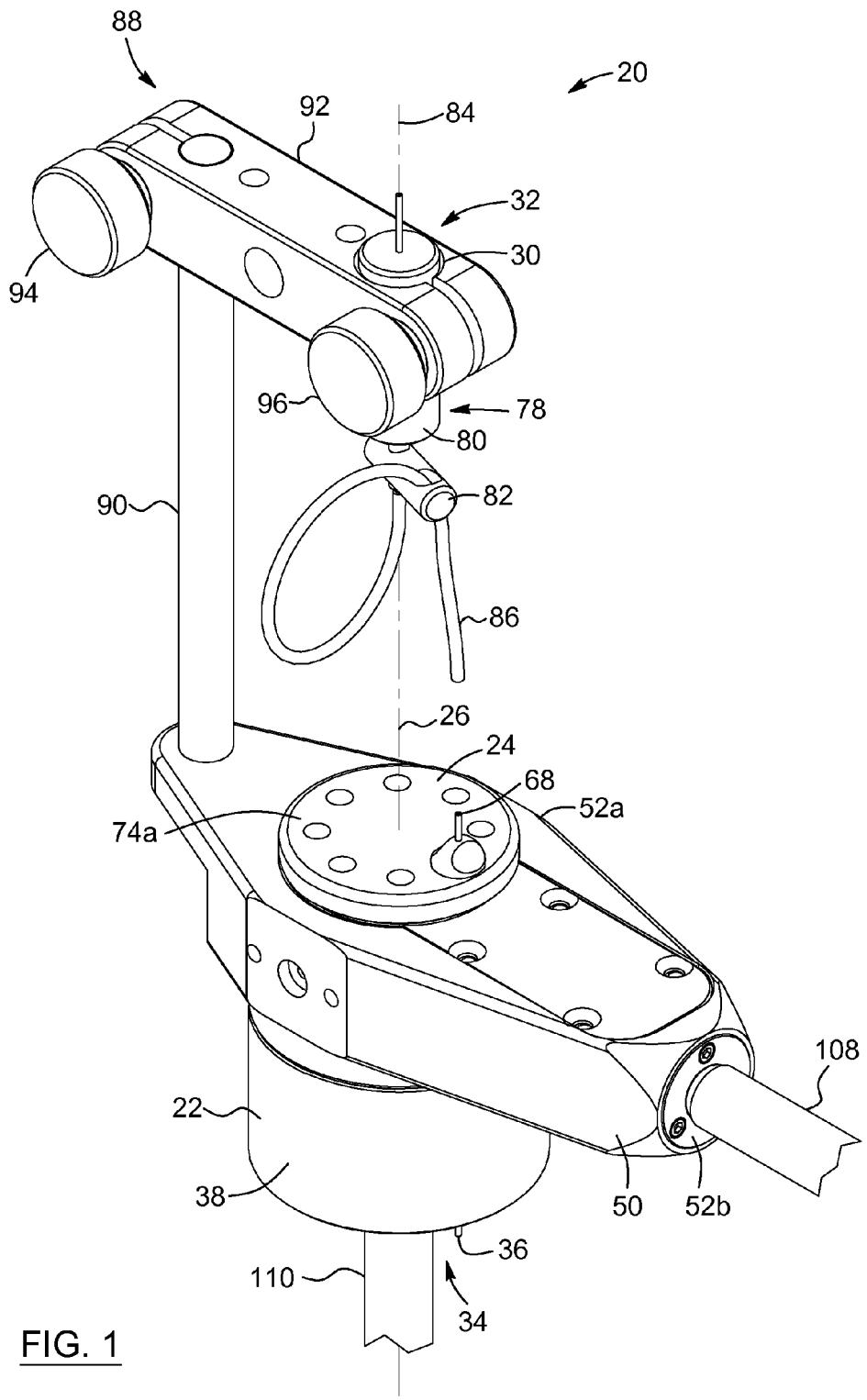
FIG. 1 is a schematic perspective side view of a hybrid fiber-optic and fluid rotary joint, in accordance with an embodiment of the invention, wherein the swivel assembly is in an upper position.
Figure 2:
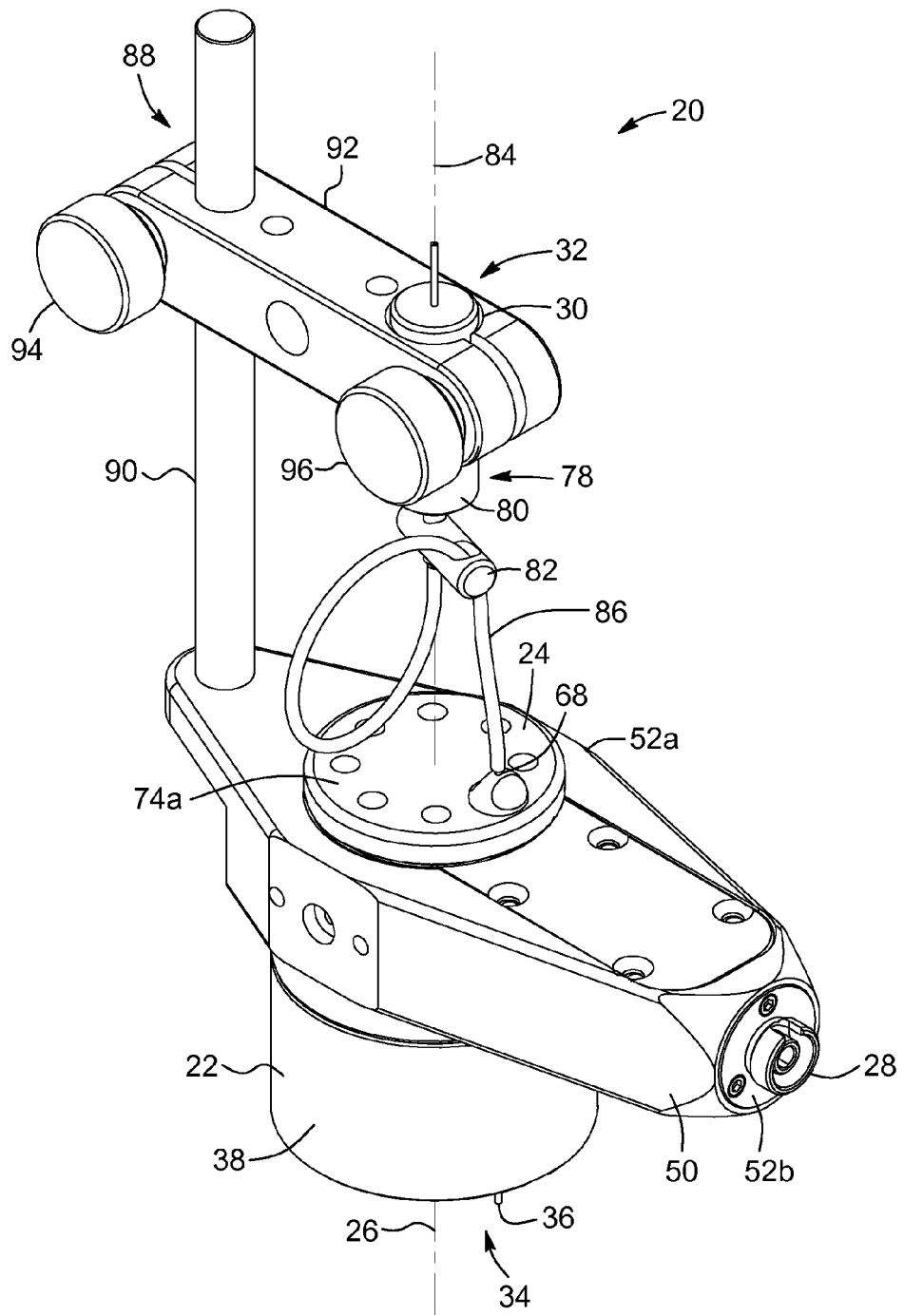
FIG. 2 is a schematic perspective side view of the hybrid fiber-optic and fluid rotary joint of FIG. 1, wherein the swivel assembly is in a lowered position and with a flexible conduit thereof connected to the fluid conduit.
Figure 3:
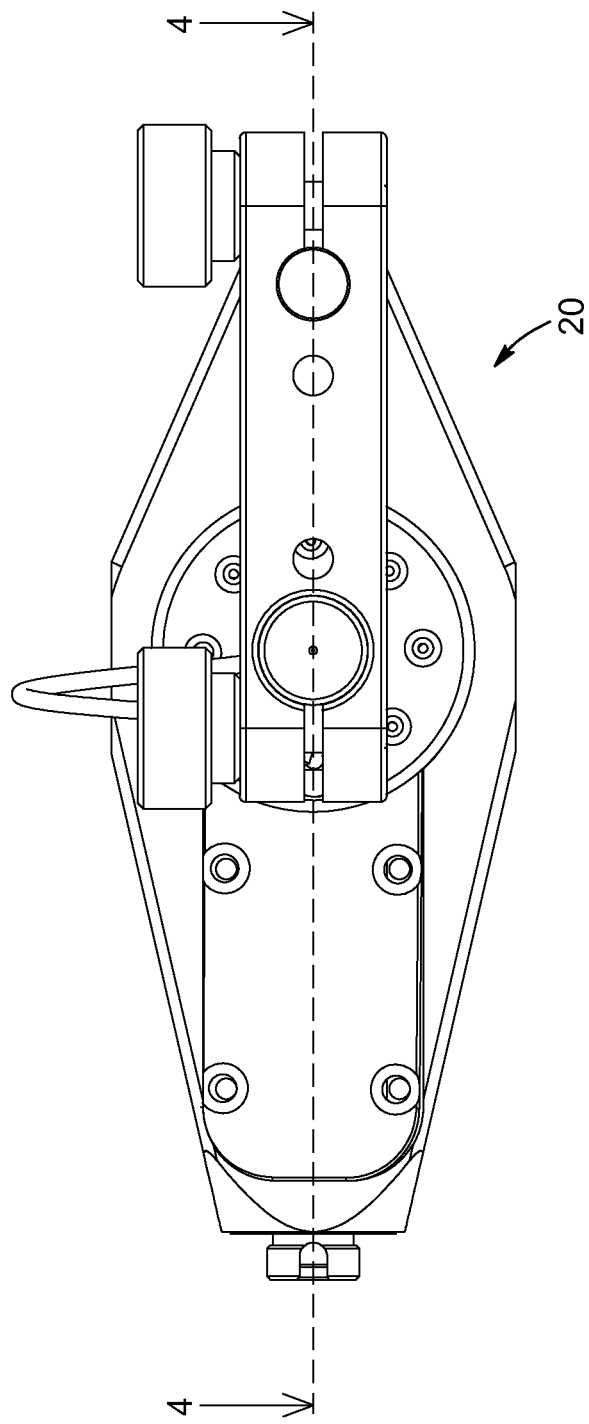
FIG. 3 is a schematic top view of the hybrid fiber-optic and fluid rotary joint of FIG. 2.

In the following description, similar features in the drawings have been given similar reference numerals and in order to weigh down the figures, some elements are not referred to on some figures if they were already identified in preceding figures.

According to an aspect of the invention, there is provided a hybrid fiber-optic and fluid rotary joint. For simplicity, the hybrid fiber-optic and fluid rotary joint will also be referred to herein as a "hybrid rotary joint".

Advantageously, embodiments of the invention permit the simultaneous, independent and rotation-insensitive delivery of light signals and fluid from an input port to an output port rotating relative to each other. In addition, embodiments of the invention yield a most compact, passive and bidirectional hybrid rotary joint, in which the variation of optical signal due to the fluid tube shading as it moves across the beam is minimized by expanding the optical beam in one direction.

In the context of optogenetic experiments, the output optical fiber component and fluid receiver may be attached to freely moving laboratory animals in order to deliver light and fluid thereto in a manner that does not restrain and that remains essentially unaffected by the movement of the animal. However, while advantageous for in vivo optogenetics applications to facilitate delivery of light signals and fluid through optical fibers and fluid conduits to freely moving animals, it will be understood by one of ordinary skill in the art that any medical or industrial application that may require connecting optical fibers and fluid conduits to a rotating object could benefit from embodiments of the invention. Some examples of medical uses could be dialyzes combined with some sort of monitoring over optical fiber, the optical monitoring of the sugar level in blood and insulin administration, and the like. A non-limiting example of an industrial application may be a robotic arm capable of laser light and liquid or gas delivery.

Figure 10:
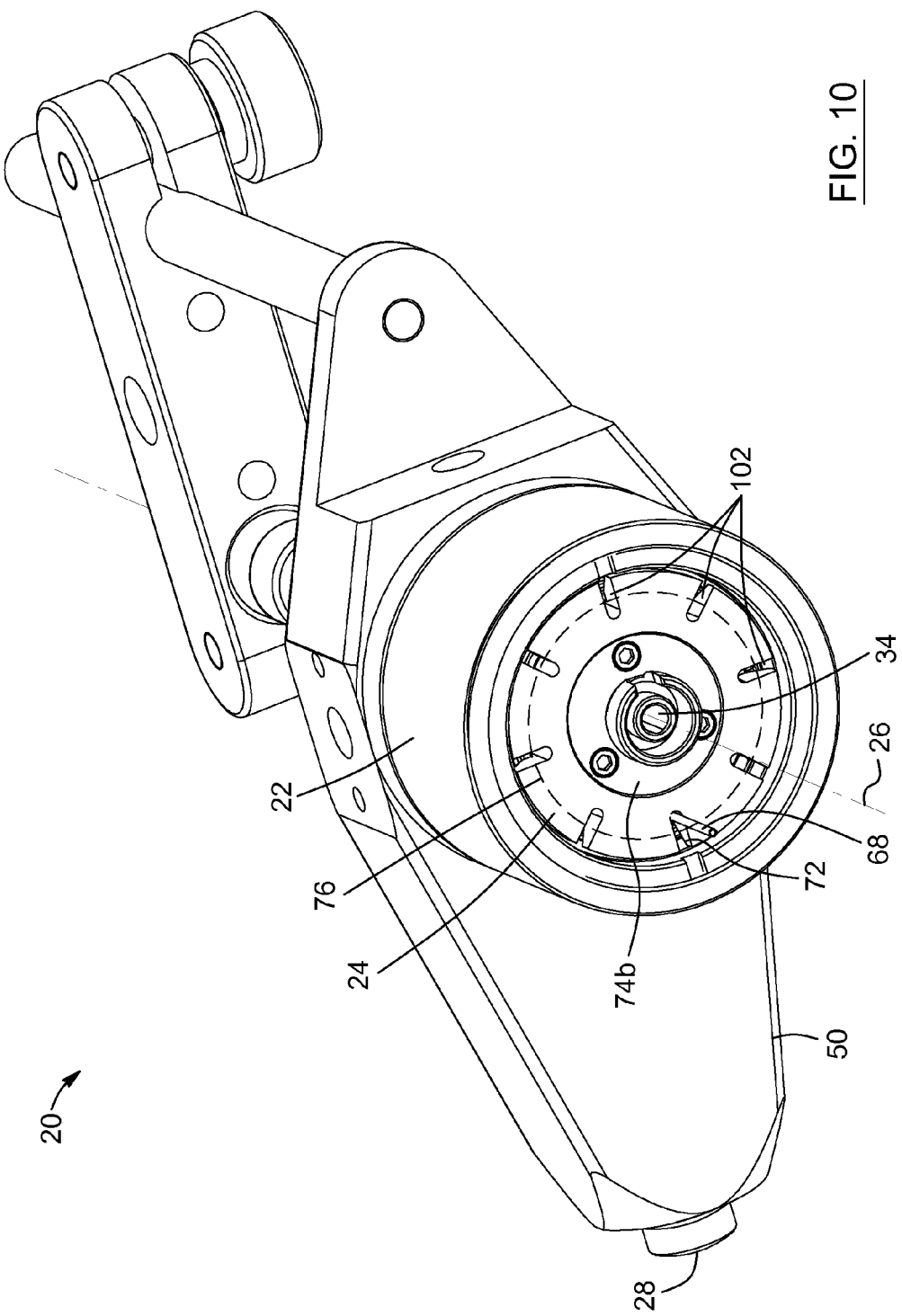
FIG. 10 is a schematic perspective bottom of the hybrid fiber-optic and fluid rotary joint of FIG. 2.

Referring now to FIGS. 1 and 10, there is shown a hybrid rotary joint 20 according to an embodiment of the invention. The hybrid rotary joint 20 generally includes a stationary component 22 and a rotating component 24, which are rotatable relative to each other about a rotation axis 26. The stationary component 22 includes an optical input port 28 and a fluid input port 30 to which may be connected an input optical fiber component 108 and a fluid source or reservoir 32 (e.g., a swivel assembly), respectively. The rotating component 24 includes an optical output port 34 and a fluid output port 36 to which may be connected an output optical fiber component 110 and a fluid receiver (not shown). However, it will be understood by one of ordinary skill in the art that since the hybrid rotary joint may be bidirectional, the input and output for either fluids, light or both may be reversed in other embodiments, that is, with the input on the rotating side and the output on the stationary side.

Figure 4:
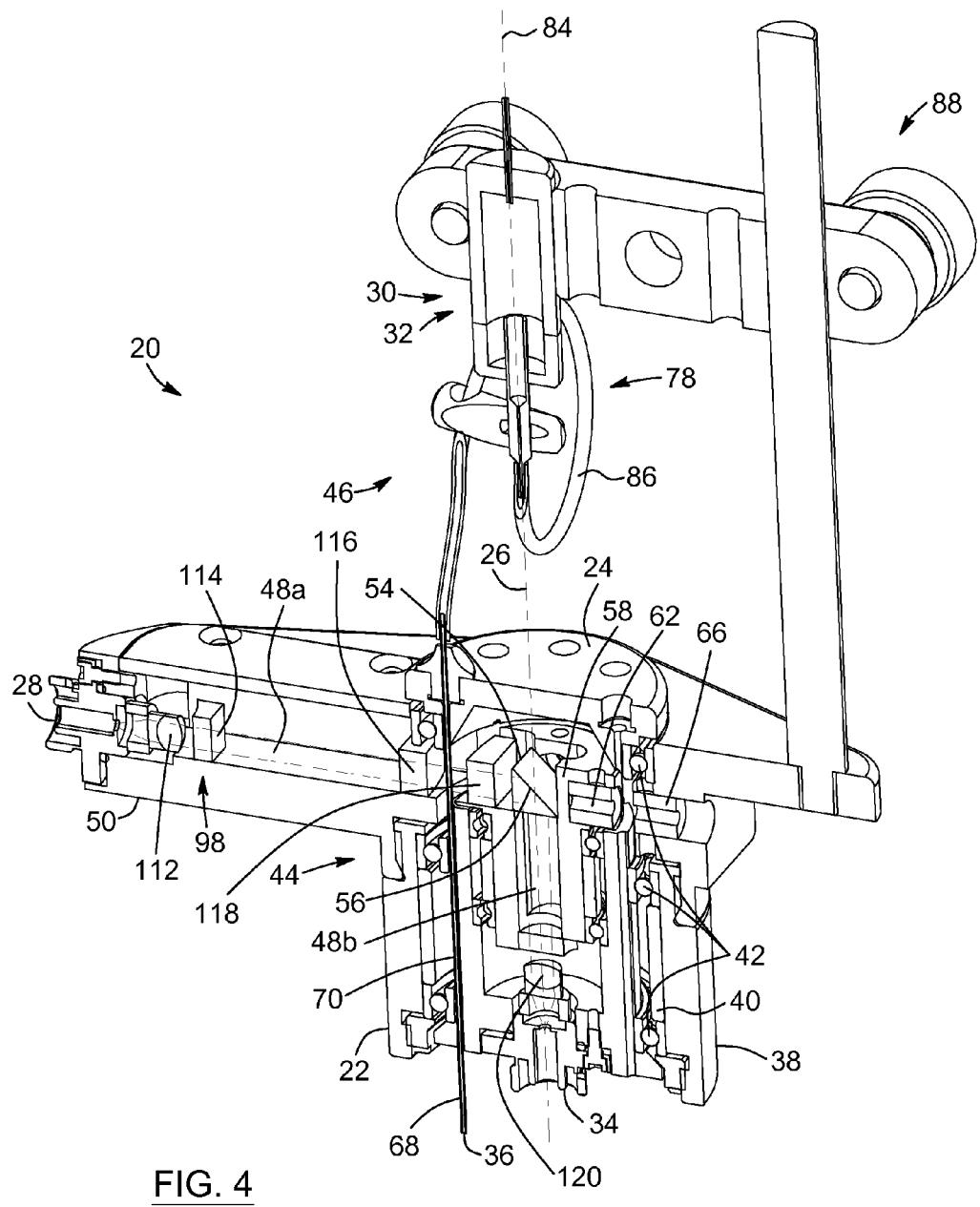
FIG. 4 is a schematic cross-sectional perspective side view of FIG. 3 taken along section line 4.

Referring additionally to FIG. 4, stationary component 22 generally defines an external housing 38 of the hybrid rotary joint 20, which has an internal cavity 40 thereinside. In the illustrated embodiment, the rotating component 24 is received inside internal cavity 40 and is rotatably mounted in the stationary component 22 for rotation relative thereto about the rotation axis 26. The stationary and rotating components 22 and 24 may be coupled to each other by one or more bearings 42 disposed therebetween and maintaining precise angular and lateral alignment during rotation. Advantageously, embodiments of the present invention permit continuous and unrestricted rotation of the rotating component 24 about the rotation axis 26 in either a clockwise or counterclockwise direction. Preferably, the bearings 42 are precision ball bearings but other coupling mechanisms could be employed without departing from the scope of the invention, for example coupling mechanisms specifically intended for use in environments that are corrosive or that require sterilization of equipment. In the illustrated embodiment, the bearings 42 include three vertically-spaced bearing elements disposed between the stationary and rotating components 22 and 24 near the upper, middle and lower portion of the hybrid rotary joint 20, as better seen in FIGS. 4 and 5. Of course, it will be understood that the bearing number and disposition shown in FIGS. 4 and 5 are for exemplary purposes and that other configurations could be used in other embodiments.

In the illustrated embodiment, the stationary and rotating components 22 and 24 are both generally cylindrical in shape, but may assume any other suitable shape. Furthermore, the stationary and rotating components 22 and 24 may be made of any appropriate material known in the art, preferably a lightweight yet strong material such as plastics, stainless steel, aluminum or ceramic in order to sustain frequent use.

Figure 5:
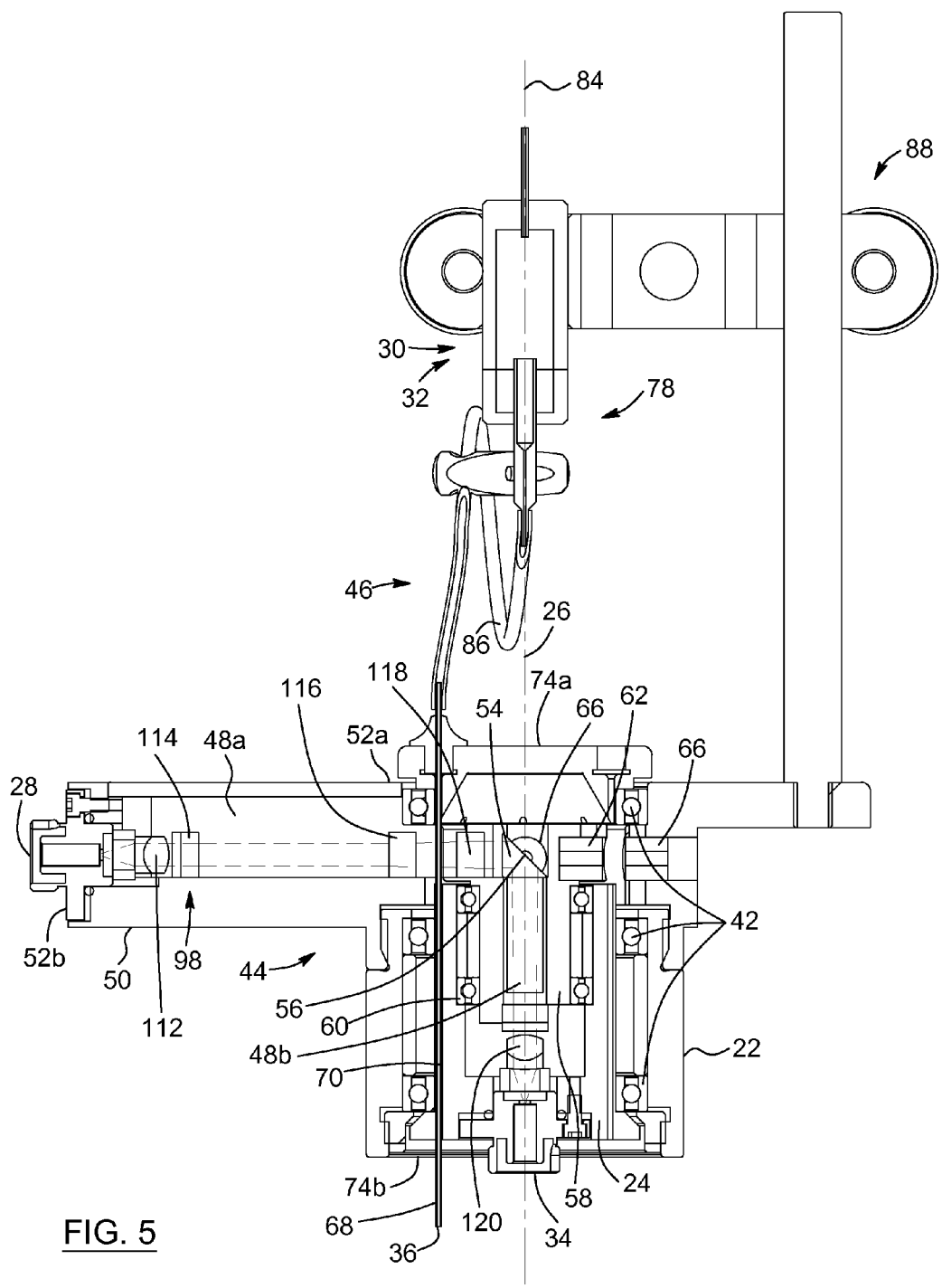
FIG. 5 is a schematic cross-sectional side elevation view of FIG. 3 taken along section line 4.

With continuing reference to FIGS. 4-5, the hybrid rotary joint 20 also includes an optical channel 44 and a fluid channel 46, which will be described in further detail herein below. In embodiments of the invention, the fluid channel 46 allows for rotation-insensitive passage of fluid across the hybrid rotary joint 20 and the optical channel 44 has minimal rotation-dependent variation of light signal level as it travels from the stationary to the rotating side of the hybrid rotary joint 20. The transfers in optical and fluid channels are simultaneous and independent.

The optical channel 44 may be configured to receive light from the input optical fiber component 108 (see FIG. 1) connected to the optical input port 28 for propagation, through the hybrid rotary joint 20, to the output optical fiber component 110 (see FIG. 1) connected to the optical output port 34. The hybrid rotary joint 20 is not limited by the type of optical fiber components connectable thereto, which may include, without being limited to, single mode fibers, polarization maintaining fibers and multimode fibers. However, it will be understood that in some embodiments, the optical input port 28 of the stationary component 22 need not be connected to an optical fiber component but may be configured to receive collimated light originating from single or multiple LEDs or laser diodes. Likewise, the light outputted at the optical output port 34 of the rotating component 24 may be kept collimated or be focused to different geometries of fiber bundles. In FIGS. 4 and 5, the optical channel 44 includes a first portion 48a adjacent to the optical input port 28 and a second portion 48b adjacent to the optical output port 34. In this embodiment, the first and second portions 48a and 48b are orthogonal to each other and respectively perpendicular and parallel to the rotation axis 26 of the hybrid rotary joint 20. In particular, the second portion 48b of the optical channel 44 is advantageously coaxially aligned with the rotation axis 26, as will be described herein below. In the illustrated embodiment, the first portion 48a of the optical channel 44 is enclosed in a transverse member 50, which is connected to an upper portion of the external housing 38 of the stationary component 22 at a proximal end 52a thereof. The transverse member 50 also has a distal end 52b at which the input optical fiber component 108 may be connected (see FIG. 1).

The optical channel 44 also includes a beam deflector 54 having a deflecting surface 56 and positioned at the junction between the first and second portions 48a and 48b of the optical channel 44. The beam deflector 54 is configured to reflect light incident thereonto from the first portion 48a through 90 degrees into the second portion 48b. In FIGS. 4 and 5, the beam deflector 54 is embodied by a right angle prism that reflects light through 90 degrees by means of total internal reflection at the deflecting surface 56. However, other appropriate deflecting optical components may alternatively or additionally be used such as simple mirrors, rectangular or pentaprisms, and the like. In particular, in some embodiments, light incident on the beam deflector 54 may alternatively be reflected from a mirror coating deposited onto the beam deflector and defining the deflecting surface 56 rather than by total internal reflection. The beam deflector 54 is preferably mounted in a beam deflector housing 58, the beam deflector housing 58 being rotatably mounted inside the rotating component 24 by a bearing assembly 60 (e.g. precision ball bearings) for rotation relative to the rotating component 24 about the rotation axis 26.

Figure 9:
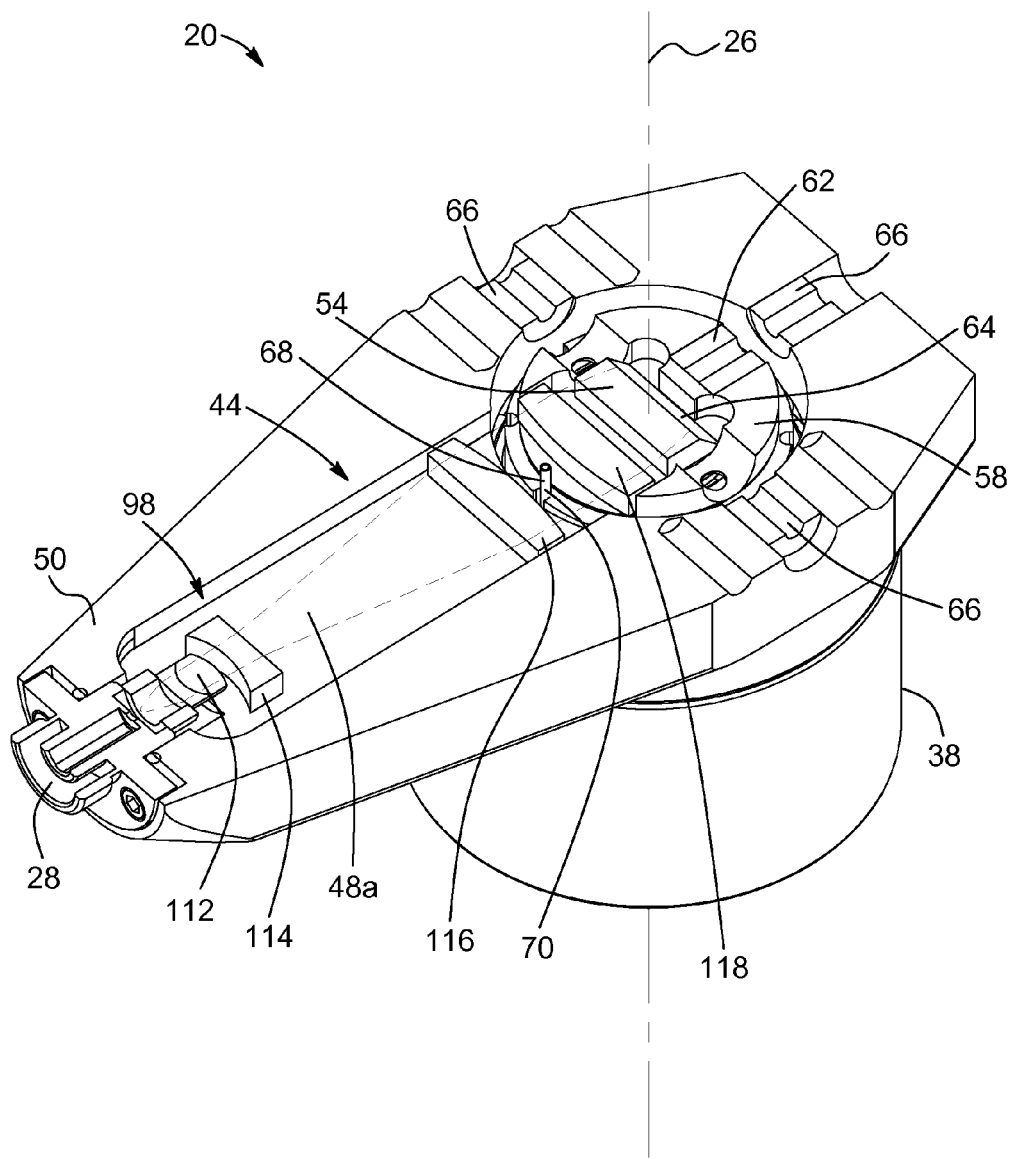
FIG. 9 is a schematic cross-sectional top perspective view of FIG. 8 taken along section line 9.

Referring now more specifically to FIG. 9, the beam deflector 54 also has an at least one first magnet 62 secured thereto, preferably near a surface 64 of the beam deflector 54 which is behind the deflecting surface 56. In addition, an at least one second magnet 66 is secured to the stationary component 22, preferably to the interior of the external housing 38 thereof and in the same transverse plane as the first magnet 62. In the illustrated embodiment, the at least one second magnet 66 includes three magnets, wherein adjacent magnets are oriented at 90 degrees relative to one another.

The role of the first and second magnets 62 and 66 on the operation of the hybrid rotary joint 20 will now be described.

As the rotating component 24 rotates within the stationary component 22, the beam deflector 54, while free to rotate on its bearing assembly 60, will be passively maintained, via the magnetic interaction existing between the first and second magnets 62 and 66, in an orientation such that the normal to the deflecting surface 56 is in the same plane as the optical axis of the light coming from the first portion 48a of the optical channel 44. As a result, the deflecting surface 56 of the beam deflector 54 always directly faces the light incident thereonto. It will be understood that the respective configuration, strength and polarity of the first and second magnets 62 and 66 are preferably selected so that a sufficiently strong magnetic interaction is established therebetween. It will also be understood that different magnet configurations can be used to achieve the desired alignment of the beam deflector 54.

From the above considerations, and referring back to FIGS. 4-5 and FIG. 9, in operation of the hybrid rotary joint 20, light from the input optical fiber component 108 (see FIG. 1) connected to the distal end 52b of the transverse member 50 is received into the transverse member 50 for propagation therein along the first portion 48a of the optical channel 44 toward the deflecting surface 56 of the beam deflector 54. In the embodiment of FIGS. 4-5 and FIG. 9, the first portion 48a of the optical channel 44 includes a first collimating lens 112 configured to receive and collimate the light from the optical fiber component 108. The collimated light is then expanded along a horizontal plane, perpendicular to the plane of FIG. 5, by a diverging cylindrical lens 114. The expansion of the light propagating along the first portion 48a of the optical channel will be discussed in more detail below. A collimating cylindrical lens 116 and a converging cylindrical lens 118 are provided for respectively collimating and converging the expanded beam into the horizontal plane before it impinges on the deflecting surface 56 of the beam deflector 54. In the illustrated embodiment, the collimating and converging cylindrical lenses 116 and 118 are disposed respectively before and after the fluid channel 46, which is parallel and radially spaced from the rotation axis 26 of the hybrid rotary joint 20. It will be understood, however, that the configuration shown in FIGS. 4, 5 and 9 is for the purpose of illustration only and that the first portion 48a of the optical channel 44 may include any other appropriate optical component adapted for expanding, collimating, focusing, or otherwise acting on the light received from the input optical fiber component 108.

Upon reaching the beam deflector 54, the light is reflected off the deflection surface 56 for propagation along the second portion 48b of the optical channel 44, in such a manner that the optical axis of the reflected light beam is substantially coaxial with the rotation axis 26 of the hybrid rotary joint 20. In this manner, no matter the rotation or current angular position of the rotating component 24, the light path along the rotation axis 26 remains unaffected. In the embodiment of FIGS. 4, 5 and 9, the second portion 48b of the optical channel 44 includes a focusing cylindrical lens 120 that focuses the light deflected by the beam deflector 54 before the light exits the hybrid rotary joint 20 via the optical output port 34. However, it will be understood that the second portion 48b of the optical channel 44 may also include any appropriate optical component adapted for expanding, collimating, focusing, or otherwise acting on the light propagating therealong. The light propagating along the second portion 48b of the optical channel 44 eventually exits the hybrid rotary joint 20 for reception by the rotating output optical fiber component 110 (see FIG. 1) connected at the bottom of the rotating component 24.

Hybrid rotary joint 20 also includes a fluid channel 46 having the fluid input port 30 connectable to the fluid source 32 on the stationary side, and the fluid output port 36 connectable to a fluid receiver (not shown) on the rotating side. The fluid channel 46 also includes a fluid conduit 68 along which fluid may be delivered between the fluid input port 30 and the fluid output port 36. The fluid conduit 68 may be embodied by any suitable tube, hose or pipe, and is preferably made of a flexible and biocompatible material. In the context of in vivo optogenetic experiments, it will be understood that one end of the fluid conduit 68 preferably extends beyond the fluid output port 36 and is used for delivering fluid to an unrestrained laboratory animal.

Figure 6:
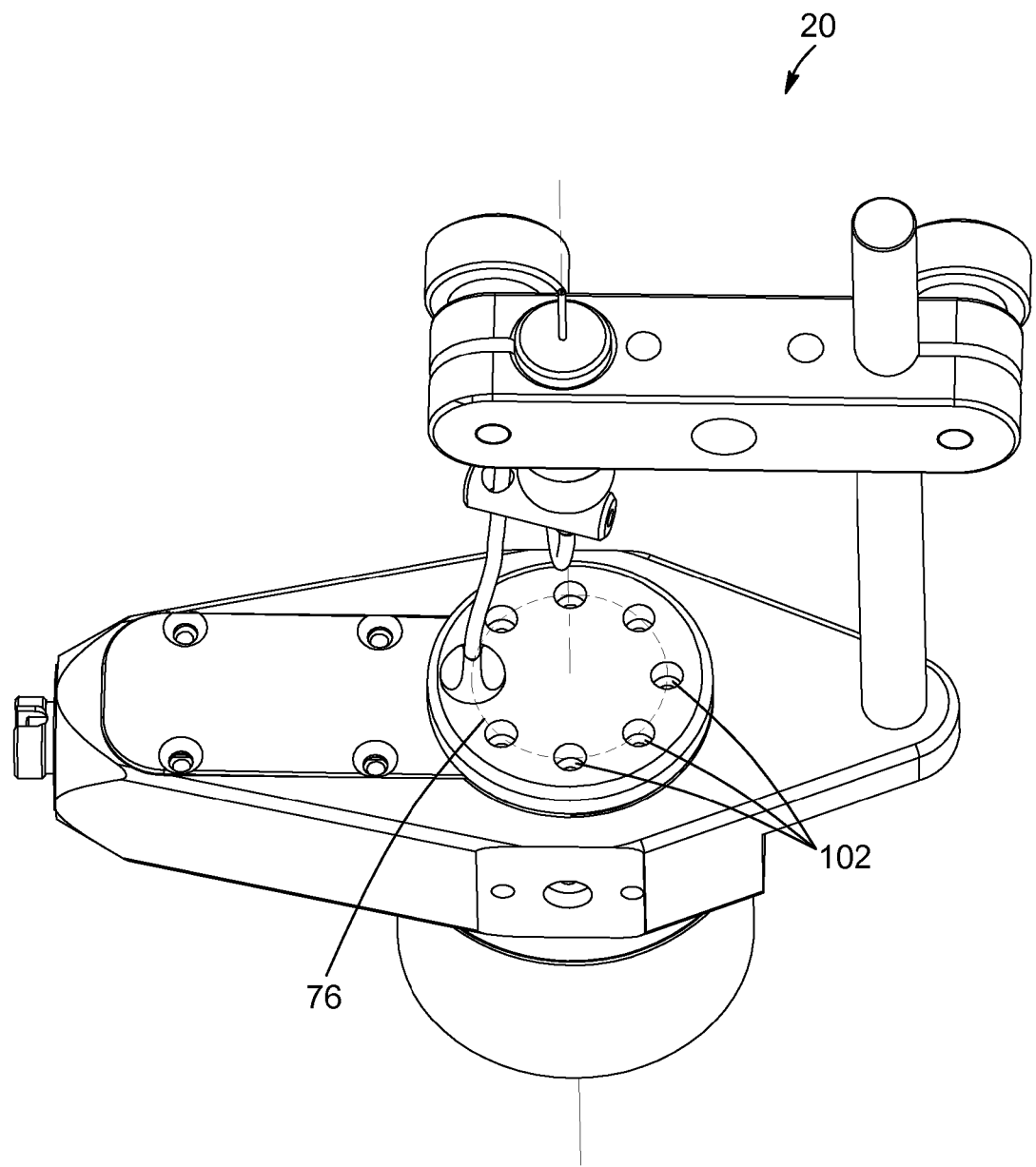
FIG. 6 is a schematic perspective top view of the hybrid fiber-optic and fluid rotary joint of FIG. 2.
Figure 7:
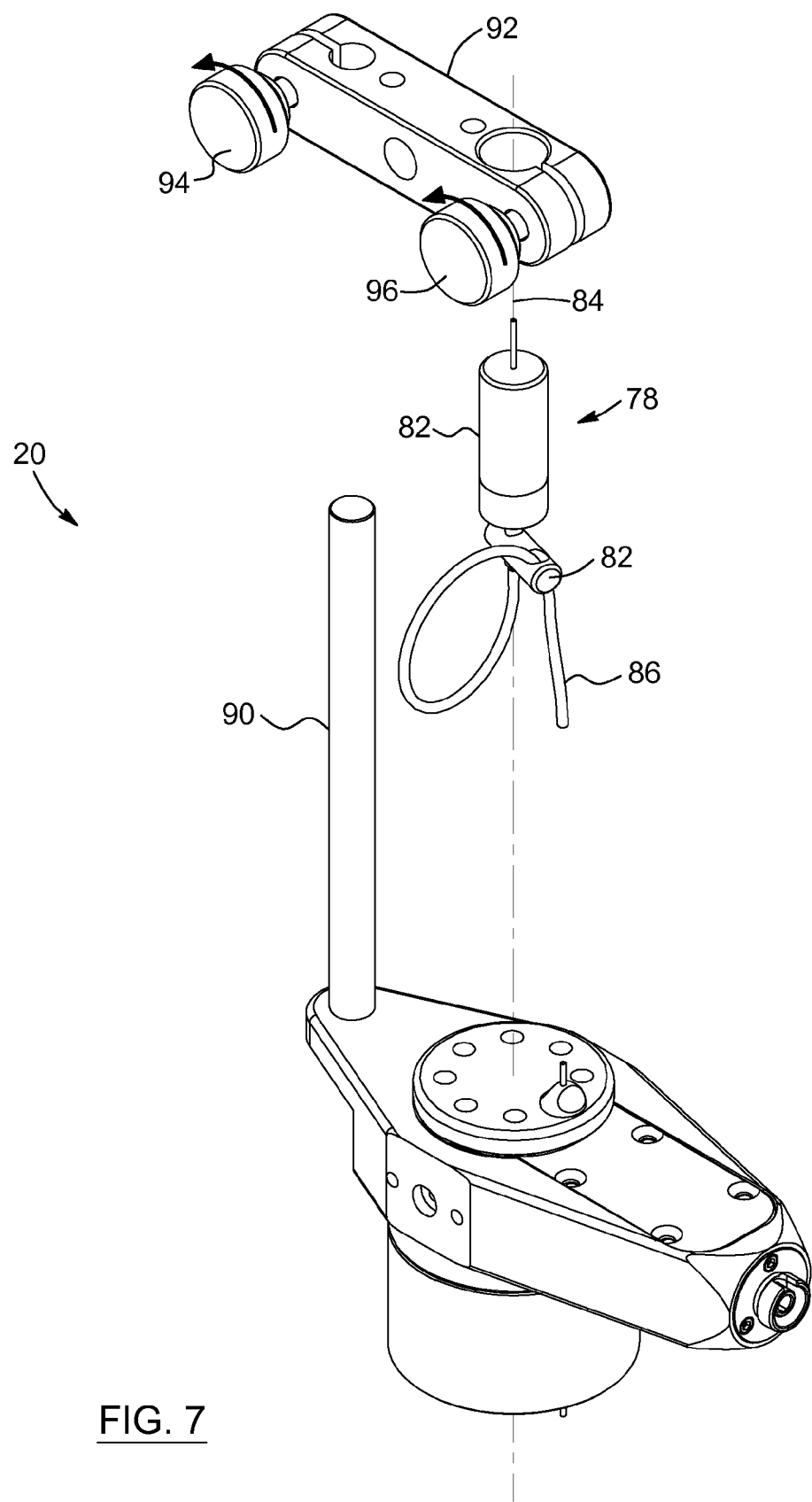
FIG. 7 is a schematic partially exploded view of the hybrid fiber-optic and fluid rotary joint of FIG. 1.
Figure 8:
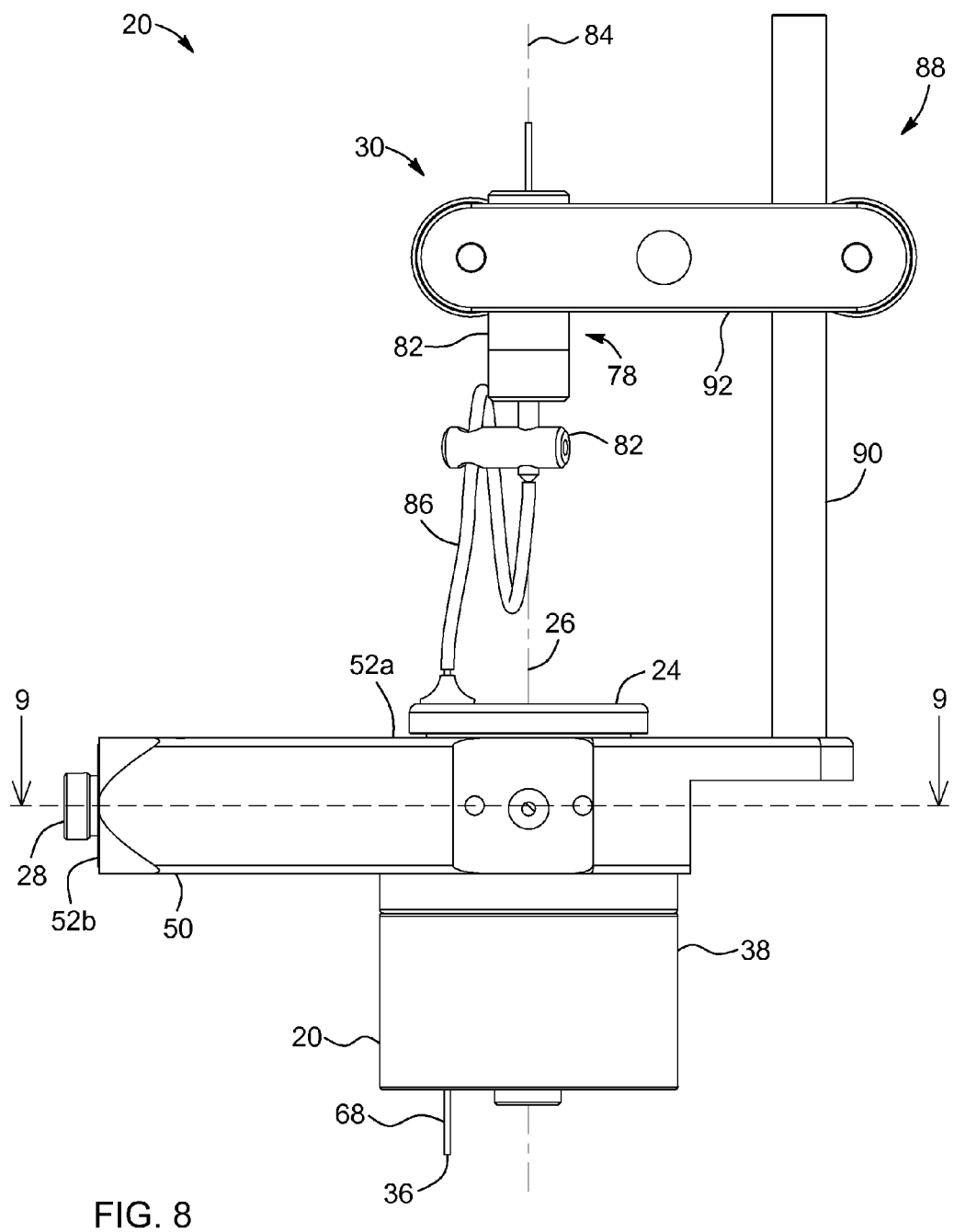
FIG. 8 is a schematic side elevation view of the hybrid fiber-optic and fluid rotary joint of FIG. 2.

In the illustrated embodiment, at least a portion 70 of the fluid conduit 68 is inserted into an axially extending opening 72 defined between top and bottom ends 74a and 74b of the rotating component 24, such that the opening 72 is substantially parallel but radially offset from the rotation axis 26 of the hybrid rotary joint 20, as shown in FIG. 10. In this configuration, it will be understood that a rotation of the rotating component 24 relative to the stationary component 22 will drive a rotation of the portion 70 of the fluid conduit 68 along a circular path 76 in a plane transverse to the rotation axis 26 (see, e.g. FIGS. 6 and 10).

Referring back to FIGS. 1-10, the fluid source 32 which is connectable to the fluid input port 30 of the hybrid rotary joint 20 is embodied by a swivel assembly 78. As known in the art, the swivel assembly 78 may typically include a stationary member 80 and a rotating member 82 rotatably coupled to the stationary member 80 for rotation relative thereto about a swivel rotation axis 84. The rotating member 82 is connectable to the fluid conduit 68 via a flexible tube 86 and is driven into rotation about the swivel rotation axis 84 by the rotation of the fluid conduit 68, which is itself driven into rotation about the rotation axis 26 by the rotation of the rotating component 24.

In the illustrated embodiment, the hybrid rotary joint 20 includes a holding fixture 88 for mounting thereto the swivel assembly 78. It will be understood that the swivel assembly 78 is preferably mounted on the holding fixture 88 such that the swivel rotation axis 84 is coaxial with the rotation axis 26. The holding fixture 88 includes a vertical portion 90 projecting upwardly from the top surface of the hybrid rotary joint 20 and a horizontal portion 92 having a first end connectable to the vertical portion 90 and a second end adapted for holding the swivel assembly above the hybrid rotary joint 20. The holding fixture 88 also includes a height adjusting mechanism 94 embodied by a thumbscrew for adjusting a height of the swivel assembly relative to the top surface of the hybrid rotary joint 20. Another thumbscrew 96 is provided for clamping or releasing the stationary member 80 of the swivel assembly to or from the holding fixture 88.

Looking at FIGS. 4-5 and FIG. 9, it will be understood that, as the fluid conduit 68 rotates along the circular path 76, there is an angular position at which the fluid conduit 68 passes in front of the deflecting surface 56 of the beam deflector 54, thus preventing momentarily and at least partially the light incident from the first portion 48a of the optical channel 44 to reach the deflecting surface 56 for deflection thereby into the second portion 48b of the optical channel 44. Embodiments of the invention provide two solutions for reducing or mitigating this detrimental effect on the optical transmission of the light through the optical channel 44. These two solutions are described herein below.

Firstly, the first portion 48a of the optical channel 44 preferably includes therealong a beam expanding assembly 98 disposed upstream of the beam deflector 54. The beam expanding assembly 98 is configured for receiving the light beam from the input optical fiber component 108 (see FIG. 1) and for increasing the width of the light beam and spreading the optical power carried thereby over a larger area. In the embodiment of FIGS. 4, 5, and 9, the beam expanding assembly 98 includes the diverging cylindrical lens 114, which, as explained above, receives the collimated from the first collimating lens 112 and expands or spreads this collimated light along a horizontal plane, perpendicular to the plane of FIG. 5. It will be understood that other optical components could alternatively or additionally be used as part of the beam expanding assembly 98. As a result of this beam expansion, a smaller proportion of the optical power carried by the light beam is blocked by the fluid conduit 68 as the fluid conduit 68 passes in front of the deflecting surface 56 of the beam deflector 54.

Figure 11:
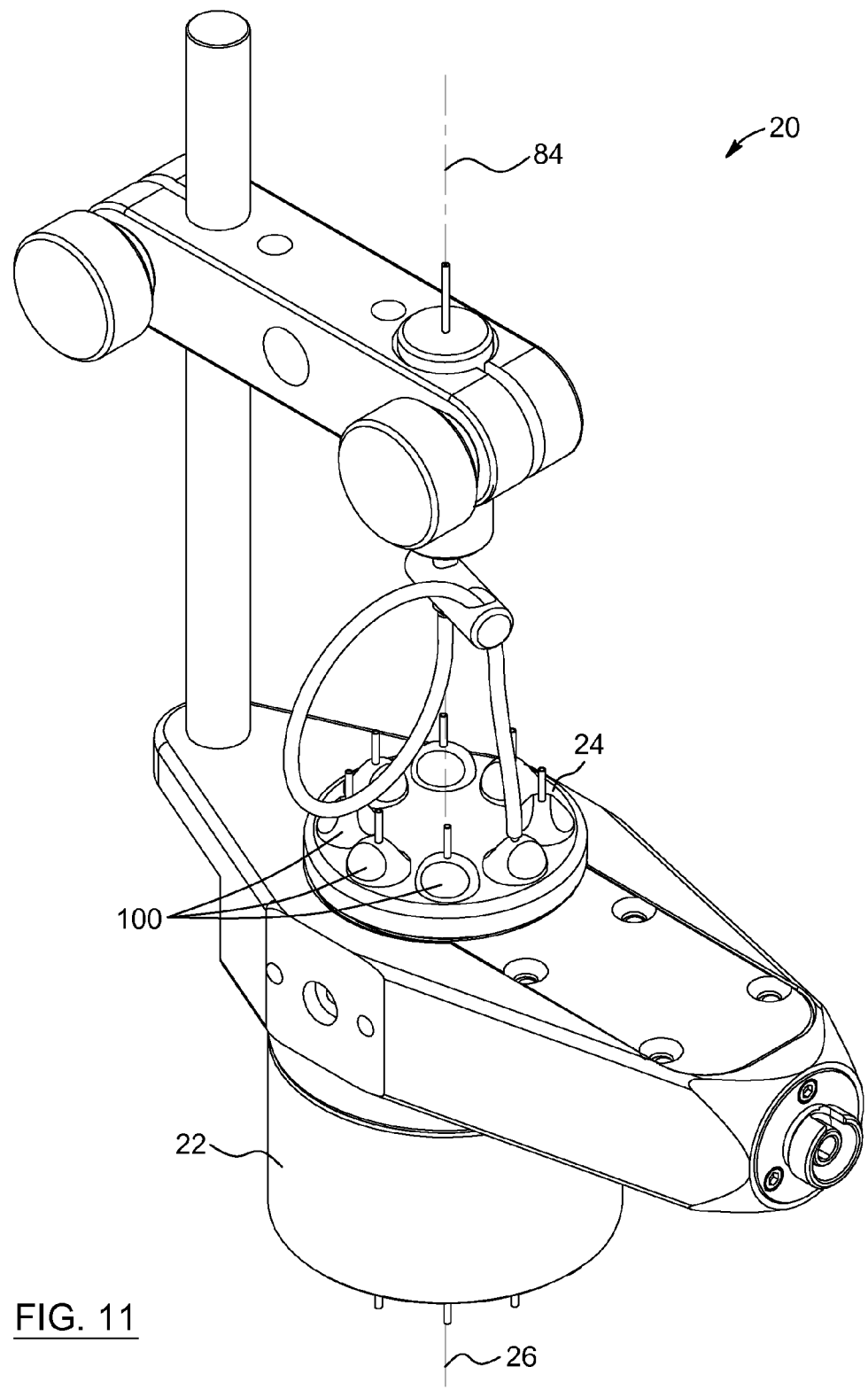
FIG. 11 is a schematic perspective side view of a hybrid fiber-optic and fluid rotary joint, in accordance with another embodiment of the invention.
Figure 12:
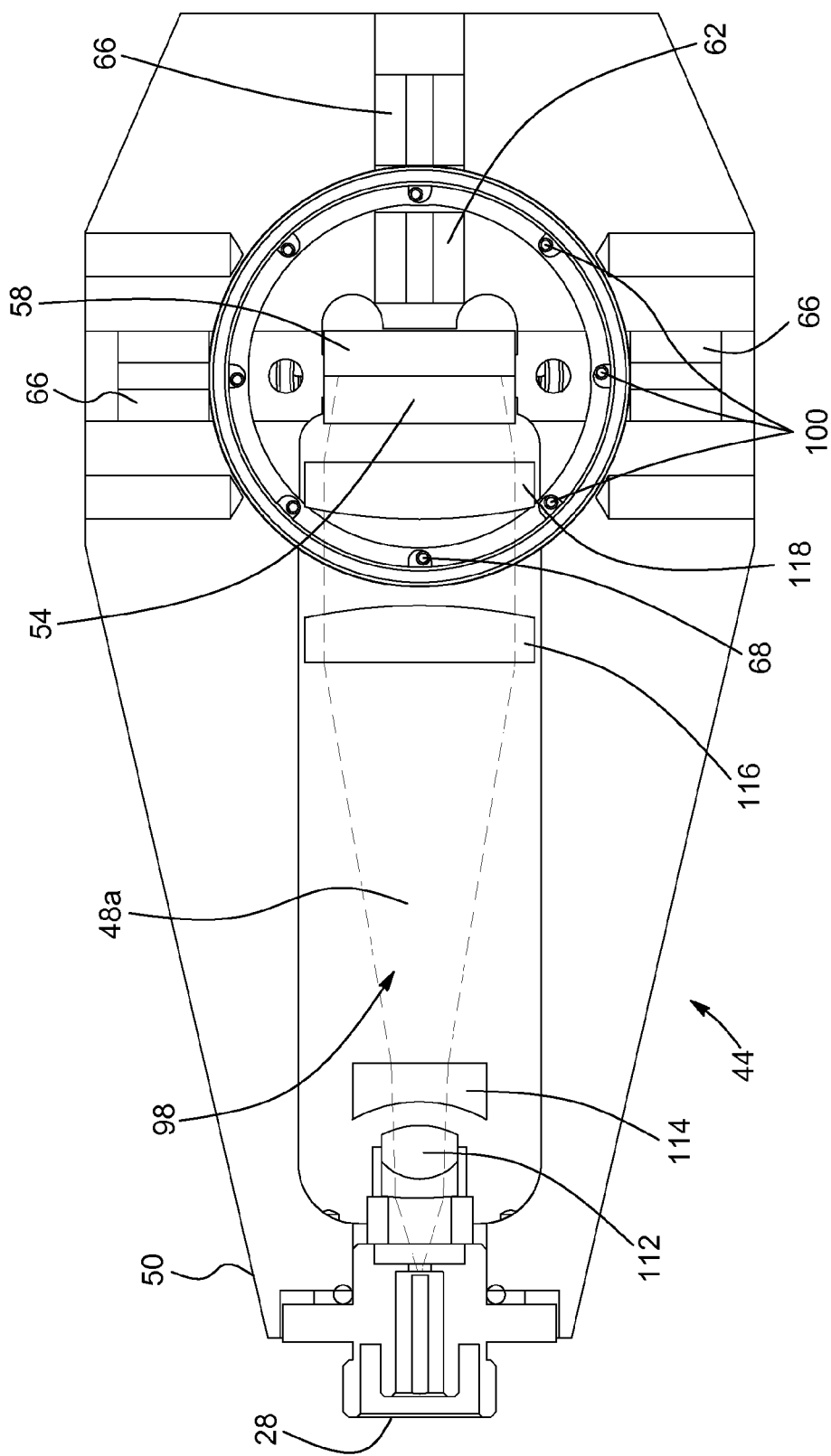
FIG. 12 is a schematic cross-sectional top view of FIG. 11, taken along a section line corresponding to section line 9 in FIG. 8.

Secondly, while the provision of the beans expanding assembly 98 contributes to reducing the fraction of optical power blocked by the fluid conduit 68, the optical power transmitted through the hybrid rotary joint 20 still fluctuates as the rotating component 24 rotates about the rotation axis 26. Referring now to FIGS. 11 and 12, in order to reduce such variations in the level of optical power transmitted through the hybrid rotary joint 20, one or more angularly spaced obstacles 100 (i.e. seven in the illustrated embodiment) may be inserted into corresponding additional axially extending openings 102 defined between the top and bottom ends of the rotating component 24 (see also FIG. 10).

It will be understood that the rotation of the rotating component 24 will also drive the rotation of the obstacles 100 along the circular path 76, thus reducing the amount of optical power transmitted by the hybrid rotary joint 20. However, this reduction of transmitted optical power will now occur independently of the angular position of the rotating component 24 with respect to the stationary component 22. It will also be understood that, in order to provide a hybrid rotary joint 20 with a substantially uniform light transmission level, the obstacles 100 are preferably identical in size and shape as the fluid conduit 68, and equally spaced from one another and the fluid conduit 68 along the circular path 76. Moreover, the number of obstacles 100 is preferably selected so that the distance between adjacent obstacles and the fluid conduit 68 along the circular path 76 corresponds substantially to the width of the light beam after passing through the beam expanding assembly 98.

In some embodiments, such as that shown in FIGS. 11-12, some or all of the obstacles 100 could be used as additional fluid conduits, thus providing a hybrid rotary joint 20 with more than one fluid channel 46.

Figure 13:
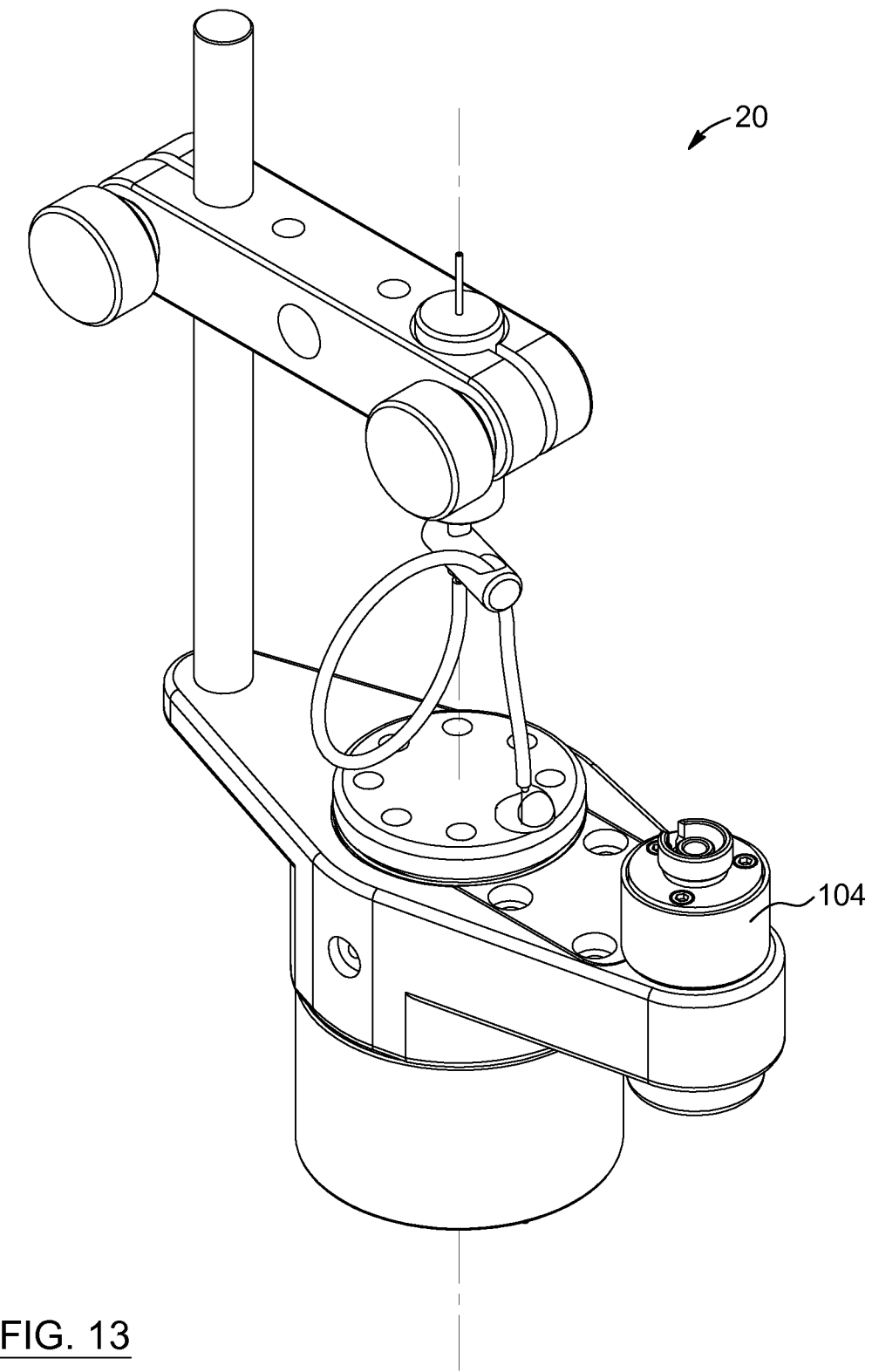
FIG. 13 is a schematic perspective side view of a hybrid fiber-optic and fluid rotary joint, in accordance with another embodiment of the invention.
Figure 14:
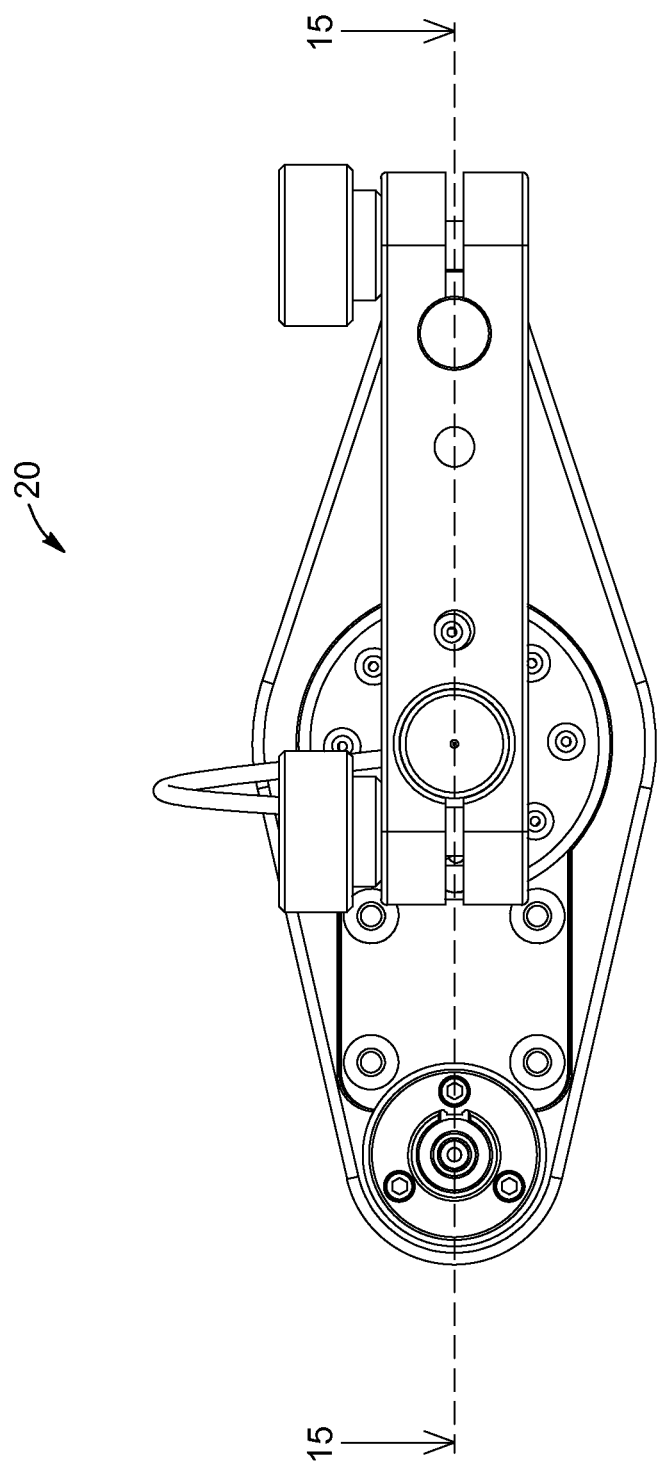
FIG. 14 is a schematic top view of the hybrid fiber-optic and fluid rotary joint of FIG. 13.
Figure 15:
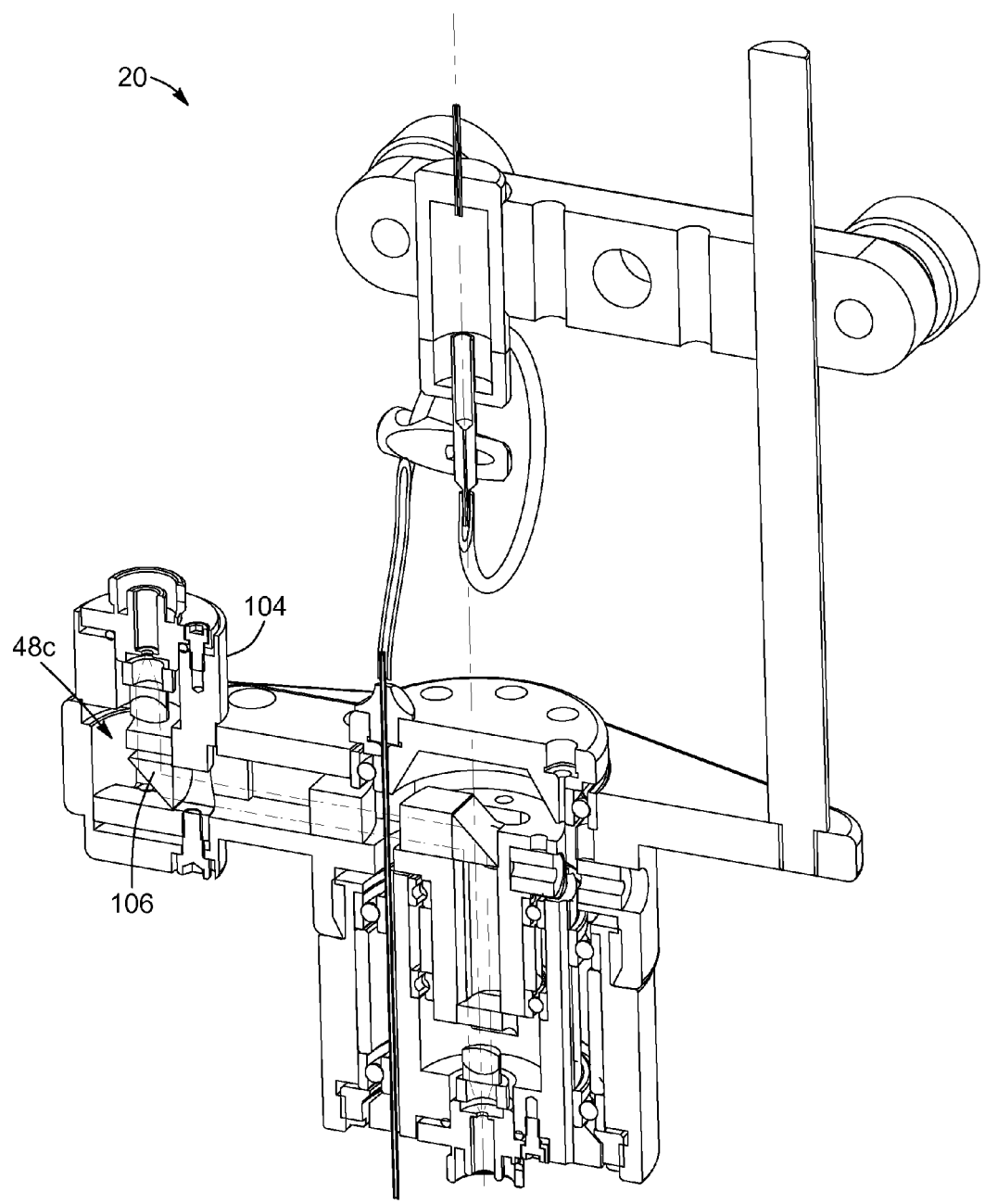
FIG. 15 is a schematic cross-sectional perspective side view of FIG. 14 taken along section line 15.

Referring now to FIGS. 13-15, there is shown another embodiment of a hybrid rotary joint 20. The hybrid rotary joint 20 includes similar features as the previously described embodiments, except that the optical channel 44 includes an additional portion 48c disposed upstream of the first portion 48a. The additional portion 48c is enclosed in an extension member 104 orthogonal to the transverse member 50 and projecting upwardly from the distal end 52b thereof. The upstream end of the additional portion 48c of the optical channel 44 defines the optical input port 28 of the hybrid rotary joint 20, to which may be connected the input optical fiber component 108 (see FIG. 1). The additional portion 48c is perpendicular to the first portion 48a and parallel to the second portion 48b. An additional beam deflector 106, embodied by a right angle prism, is provided at the junction between the additional and first portion 48a and 48c of the optical channel 44 for reflecting light incident thereonto through 90 degrees.

While the invention has been particularly shown and described with reference to the preferred embodiment thereof, it will be understood by those skilled in the art that the foregoing and other changes in form, and details may be made therein without departing from the spirit and scope of the invention.

What is claimed:

1. A hybrid rotary joint including a liquid connection for coupling to a fluid port of a liquid rotary joint, comprising:
   a stationary component having a first optical port and a first fluid port;
   a rotating component having a second optical port and a second fluid port, wherein the rotating component is rotatably coupled to the stationary component, such that the rotating component is rotatable with respect to the stationary component about a rotational axis of the rotating component, wherein light is coupled between the first optical port and the second optical port for all rotations of the rotating component with respect to the stationary component, and wherein a fluid medium is conducted between the first fluid port and the second fluid port for all of the rotations of the rotating component with respect to the stationary component; and
   a beam deflector for deflecting an optical beam emitted from the first optical port into the hybrid rotary joint into the second optical port along a first central axis of the first optical port, wherein the second optical port has a second central axis perpendicular to the first central axis, and wherein the beam deflector is mounted in a beam deflector housing rotationally coupled to the stationary component such that the optical beam emitted from the first optical port remains incident on a face of the beam deflector independent of the rotation of the rotating component and is directed to provide a deflected beam incident on the second optical port.

2. The hybrid rotary joint of claim 1, wherein the beam deflector housing is rotatably coupled to the rotating component, such that the beam deflector housing is rotatable with respect to the rotating component about the rotational axis of the rotating component, whereby the beam deflector is permitted to remain stationary with respect to the stationary component while the rotating component rotates.

3. The hybrid rotary joint of claim 2, further comprising:
   at least one first magnet disposed at a periphery of the stationary component surrounding a portion of the beam deflector housing; and
   at least one second magnet disposed at an edge of the beam deflector housing for engaging with the at least one first magnet, so that the beam deflector housing remains stationary with respect to the stationary component independent of the rotation of the rotating component.

4. The hybrid rotary joint of claim 1, further comprising a flexible tube linking the first fluid port and a fluid conduit of the rotating component, wherein the fluid conduit is disposed near a periphery of the rotating component for conducting the fluid medium between the flexible tube and the second fluid port, wherein the fluid conduit passes within the optical beam for some rotations of the rotating component.

5. The hybrid rotary joint of claim 4, further comprising a beam expander disposed between the first optical port and the beam deflector, whereby a width of the optical beam incident on the beam deflector is enlarged to reduce the effect of blockage of a portion of the optical beam by the at least one fluid conduit.

6. The hybrid rotary joint of claim 4, further comprising a plurality of obstacles or additional fluid conduits disposed at angular positions around the rotational axis of the rotating components along with the fluid conduit such that only one of the fluid conduit or an individual one of the plurality of obstacles or additional fluid conduits can pass fully across the optical beam for any given rotation, whereby variation in optical transmission of the optical beam is reduced with respect to the rotation of the rotating component.

7. The hybrid rotary joint of claim 1, wherein the first optical port and the second optical port are fiber optic ports adapted for receiving fiber optic connections.

8. The hybrid rotary joint of claim 1, wherein the first optical port is an input optical port, wherein the second optical port is an output optical port, wherein the first fluid port is a fluid input port, and wherein the second fluid port is a fluid output port.

9. A method of providing delivery of a fluid and light through a rotatable hybrid rotary joint, the method comprising:
   providing fluid flow between a first fluid port of a stationary component of the rotatable hybrid rotary joint and a second fluid port of a rotating component of the hybrid rotary joint;
   transmitting light between a first optical port of the stationary component of the hybrid rotary joint and a second optical port of the rotating component of the hybrid rotary joint;
   rotating the rotating component with respect to the stationary component about a rotational axis of the rotating component while the providing provides the fluid flow and the transmitting transmits the light all rotations of the rotating;
   deflecting an optical beam emitted from the first optical port into the hybrid rotary joint into the second optical port along a first central axis of the first optical port with a beam deflector, wherein the second optical port has a second central axis perpendicular to the first central axis; and
   mounting a housing of the beam deflector such that the optical beam emitted from the first optical port remains incident on a face of the beam deflector independent of the rotation of the rotating component and is directed to provide a deflected beam incident on the second optical port.

10. The method of claim 9, further comprising rotatably coupling the beam deflector to the rotating component, such that the beam deflector housing is rotatable with respect to the rotating component about the rotational axis of the rotating component, whereby the beam deflector is permitted to remain stationary with respect to the stationary component while the rotating component rotates.

11. The method of claim 10, further comprising:
   providing at least one first magnet disposed at a periphery of the stationary component surrounding a portion of the beam deflector housing; and
   providing at least one second magnet disposed at an edge of the beam deflector housing for engaging with the at least one first magnet, so that the beam deflector housing remains stationary with respect to the stationary component independent of the rotation of the rotating component.

12. The method of claim 9, further comprising linking the first fluid port and a fluid conduit of the rotating component with a flexible tube, wherein the fluid conduit is disposed near a periphery of the rotating component for conducting the fluid medium between the flexible tube and the second fluid port, wherein the fluid conduit passes within the optical beam for some rotations of the rotating component.

13. The method of claim 12, further comprising expanding a width of the optical beam incident on the beam deflector with a beam expander disposed between the first optical port and the beam deflector, to reduce the effect of blockage of a portion of the optical beam by the at least one fluid conduit.

14. The method of claim 12, further comprising providing a plurality of obstacles or additional fluid conduits disposed at angular positions around the rotational axis of the rotating components along with the fluid conduit such that only one of the fluid conduit or an individual one of the plurality of obstacles or additional fluid conduits can pass fully across the optical beam for any given rotation, whereby variation in optical transmission of the optical beam is reduced with respect to the rotation of the rotating component.

15. The method of claim 9, wherein the first optical port and the second optical port are fiber optic ports adapted for receiving fiber optic connections.

16. The method of claim 9, wherein the first optical port is an input optical port, wherein the second optical port is an output optical port, wherein the first fluid port is a fluid input port, and wherein the second fluid port is a fluid output port.

17. A hybrid rotary joint, comprising:
a stationary component having a optical input port and a fluid input port;
a rotating component having an optical output port and a fluid output port, wherein the rotating component is rotatably coupled to the stationary component, such that the rotating component is rotatable with respect to the stationary component about a rotational axis of the rotating component;
a beam deflector rotatably coupled to the rotating component about the rotational axis of the rotating component that deflects an optical beam emitted from the optical input port into the hybrid rotary joint along a first central axis of the first optical port, wherein the optical output port has a second central axis perpendicular to the first central axis, and wherein the beam deflector is mounted in a beam deflector housing rotationally coupled to the stationary component by one or more first magnets mounted in the beam deflector housing and one or more second magnets mounted in the rotational component, such that the optical beam emitted from the optical input port remains incident on a face of the beam deflector independent of the rotation of the rotating component and is directed to provide a deflected beam incident on the optical output port;
a fluid conduit disposed within the rotating component for conducting a fluid medium between the fluid input port and the fluid output port for all of the rotations of the rotating component with respect to the stationary component, wherein the fluid conduit is disposed near a periphery of the rotating component so that the fluid conduit passes within the optical beam for some rotations of the rotating component;
a flexible tube linking the fluid input port and the fluid conduit, for conducting the fluid medium between the flexible tube and the fluid output port; and
a beam expander disposed between the optical input port and the beam deflector, whereby a width of the optical beam incident on the beam deflector is enlarged to reduce the effect of blockage of a portion of the optical beam by the at least one fluid conduit.

18. The hybrid rotary joint of claim 17, further comprising a plurality of obstacles or additional fluid conduits disposed at angular positions around the rotational axis of the rotating components along with the fluid conduit such that only one of the fluid conduit or an individual one of the plurality of obstacles or additional fluid conduits can pass fully across the optical beam for any given rotation, whereby variation in optical transmission of the optical beam is reduced with respect to the rotation of the rotating component.

19. The hybrid rotary joint of claim 1, wherein the rotating component is a first rotating component of an optical rotary joint, and wherein the stationary component comprises:
a first stationary component of the optical rotary joint;
a liquid rotary joint having a second rotating component and a second stationary component, wherein the liquid rotary joint has a third fluid port located on the second rotating component and wherein the first fluid port is located on the second stationary component of the liquid rotary joint;
a mounting fixture for securing the second stationary component of the liquid rotary joint to the first stationary component; and
a liquid coupling for connecting the third fluid port of the liquid rotary joint with a fourth fluid port located on the first rotating component of the optical rotary joint, wherein the first rotating component has a fluid conduit coupling the second fluid port to the fourth fluid port for conducting the fluid medium therethrough.

20. The method of claim 9, wherein the rotating component is a first rotating component of an optical rotary joint, wherein the providing fluid flow between a first fluid port of a stationary component of the rotatable hybrid rotary joint and a second fluid port of a rotating component of the hybrid rotary joint comprises:
first providing the fluid flow through a liquid rotary joint having a second rotating component and a second stationary component, wherein the liquid rotary joint has a third fluid port located on the second rotating component and wherein the first fluid port is located on the second stationary component of the liquid rotary joint;
securing the second stationary component of the liquid rotary joint to the first stationary component with a mounting fixture of the first stationary component;
coupling the fluid flow between the third fluid port of the liquid rotary joint with a fourth fluid port located on the first rotating component of the optical rotary joint; and
coupling the fluid flow between the first fluid port to the fourth fluid port through the first rotating component of the optical rotary joint.

21. An optical rotary joint including a liquid connection for coupling to a fluid port of a liquid rotary joint, comprising:
a stationary component having a first optical port; and
a rotating component having a second optical port, a first fluid port and a second fluid port, wherein the rotating component is rotatably coupled to the stationary component, such that the rotating component is rotatable with respect to the stationary component about a rotational axis of the rotating component, wherein light is coupled between the first optical port and the second optical port for all rotations of the rotating component with respect to the stationary component, and wherein a fluid medium is conducted between the first fluid port and the second fluid port through at least one fluid conduit for all of the rotations of the rotating component with respect to the stationary component;
a liquid connection adapted to couple the second fluid port to the fluid port of an external liquid rotary joint, wherein the fluid port of the external liquid rotary joint is a rotating port of the external liquid rotary joint; and
a mounting fixture for securing a stationary component of the external liquid rotary joint to the stationary component of the optical rotary joint.

22. The optical rotary joint of claim 21, further comprising a beam deflector for deflecting an optical beam emitted from the first optical port into the hybrid rotary joint into the second optical port along a first central axis of the first optical port, wherein the second optical port has a second central axis perpendicular to the first central axis, and wherein the beam deflector is mounted in a beam deflector housing rotationally coupled to the stationary independent of the rotation of the rotating component.

23. The optical rotary joint of claim 22, further comprising a beam expander disposed between the first optical port and the beam deflector, whereby a width of the optical beam incident on the beam deflector is enlarged to reduce the effect of blockage of a portion of the optical beam by the at least one fluid conduit.

24. The optical rotary joint of claim 23, further comprising a plurality of obstacles or additional fluid conduits disposed at angular positions around the rotational axis of the rotating components along with the fluid conduit such that only one of the fluid conduit or an individual one of the plurality of obstacles or additional fluid conduits can pass fully across the optical beam for any given rotation, whereby variation in optical transmission of the optical beam is reduced with respect to the rotation of the rotating component.

\* \* \* \* \*